3,119,849
ESTERIFICATION PROCESS
Reuben O. Feuge, New Orleans, and Robert K. Willich, Slidell, La., assignors to the United States of America as represented by the Secretary of Agriculture
No Drawing. Filed Feb. 27, 1962, Ser. No. 176,156
6 Claims. (Cl. 260—404.8)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to an improved esterification process. More particularly, this invention relates to an esterification process whereby monoglycerides and diglycerides can be further esterified without the usual attendant side reactions such as interesterification which latter reaction is characteristic of conventional processes applied to esterification of fatty acid glycerides.

In general, the process that is the subject of this invention is a direct esterification carried out using an acid-type catalyst, moisture free reactants, and carefully controlled reaction conditions designed to effect the removal of "water of reaction," immediately as it is formed.

It has been found that by use of the process of this invention glycerides heretofore impossible to prepare efficiently and in acceptable yield can be synthesized economically on a large scale. It is possible, for example, to prepare easily and in good yield the oleodisaturated glycerides of palmitic and stearic acids. A specific mixture of the two named glycerides closely resembles cocoa butter. Such mixtures find utility in the confectionery industry.

Compounds such as bis[1-(stearoyloxymethyl)-2-(stearoyloxy)ethyl] adipate, represented by the following formula, can also be prepared.

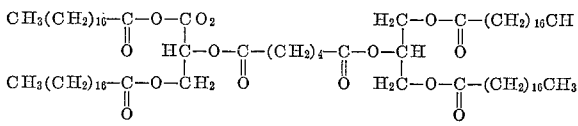

Prior to this invention, conventional processes employed for preparing specific fatty acid glycerides necessitated inefficient final product separation procedures, such as extensive fractional crystallization schemes. These time consuming separation techniques were required in order to isolate the desired product from the ultimate reaction mixture since glyceride esterification heretofore invariably produced as side reactions considerable amounts of intermolecularly esterified products. For example, a reaction mixture containing oleic acid and dipalmitin, prepared for esterification in the correct reactant ratio to yield oleodipalmitin as the final esterification product would yield besides the desired oleodipalmitin product, substantial quantities of trisaturated glyceride, and diunsaturated monosaturated glycerides, together with lesser amounts of triunsaturated glyceride. The final product mixture containing oleodipalmitin along with all of the unwanted products would then necessarily be subjected to separation techniques for the purpose of isolating the desired product. So widely accepted were these inefficient separation methods in the prior art, prior to the discovery of the instant process, that almost without exception esterification processes for preparing specific triglycerides included reaction product separation schemes. The separation schemes usually were accompanied by plans designed to recycle the unwanted glyceride fractions back through the process. Separation and recycling process steps were mandatory if commercially acceptable yields of the desired product were hoped for.

As will be shown in the specific examples that follow, the improved esterification process of this invention permits the direct esterification with oleic acid of a diglyceride such as the diglyceride of stearic acid with approximately 90% yield of oleodistearin, calculated on the total weight of glycerides. Particular triglycerides such as oleodistearin and oleodipalmitin can be prepared by this improved esterification process and the reaction product will, with certainty, contain the oleic acid radical in the intended ratio relative to the other fatty acid radicals in the finished glyceride molecules. Some intramolecular esterification will take place with the improved process; but, substantially no intermolecular esterification will occur. That is to say, a particular fatty acid radical may in the product produced by the improved esterification be located on the central or on a terminal position within the glycerol portion of the molecule, but the ratio of the various fatty acids one with respect to the others will be maintained within each molecule of the finished product.

The improved esterification process of this invention can also used in the esterification of monoglycerides to diglycerides, which then can be employed as such or used in the further synthesis of various triglycerides.

The improved esterification process of this invention can also be used in the esterification of diglycerides, like distearin, with dibasic acids, like adipic acid. Products of this type have been shown to have many potential uses, but heretofore it has not been possible to prepare such products on a large scale using a relatively inexpensive process. Elaborate synthesis by way of acid chlorides was required. Simple esterification by conventional procedures used heretofore always resulted in extensive interesterification and the production of sizable proportions of polymer-type products.

The present invention can be employed, of course, in the synthesis of many other glycerides of predetermined composition. To those skilled in the art it is also obvious that the invention can be employed in the preparation of esters other than those of glycerol. Propylene glycol or some other polyol having properties similar to those of glycerol can be substituted for glycerol.

It is accepted prior art that the catalysts commonly used to promote esterification also promote in the case of glyceride esterification one or more types of interesterification, which includes acidolysis, alcoholysis, and ester interchange. The alkaline type catalysts in particular show a strong tendency to promote interesterification under the usual esterification conditions.

Various metals and metal compounds are known to be esterification catalysts. Stannous chloride and zinc chloride, for example, are particularly effective esterification catalysts but again these compounds are known to promote extensive interesterification in the case of glycerides.

Hydrochloric, sulfuric, and sulfonic acids are widely used as esterification catalyst but they are also recognized as effective alcoholysis and ester interchange catalysts. The aromatic sulfonic acids have been patented as promoters of ester interchange (U.S. Patent No. 1,873,513 and German Patent No. 417,215).

Contrary to the prior art, it has now been discovered that the aromatic sulfonic acids and specifically p-toluenesulfonic acid is an excellent esterification catalysts for glycerides, applicable in those cases where interesterification must be avoided. It has been found possible to employ p-toluenesulfonic acid as an esterification catalyst when scrupulous care is exercised to avoid all traces of moisture. The preferred amount of catalyst ranges between 0.1% and 0.4%, based on the weight of the fatty reactants. All reagents employed must be thoroughly free from moisture as must be the catalyst and the reaction medium. Moreover, the water produced by the esterification reaction must be removed completely from the reaction mixture immediately upon being formed.

A preferred method of removing the water of esterification from the reaction mixture as rapidly as the water is formed consists of continuously passing the vapor of hydrocarbons through the reaction mixture. The hydrocarbons not only sweep out the water vapors but also form lower-boiling azeotropes with the water vapor. The hydrocarbon vapors can be formed by continuously feeding a stream of hydrocarbons into the reactants, said hydrocarbons having a boiling point lower than the reaction temperature. Hydrocarbon vapors can also be passed through the reactants by carrying out the reaction in the presence of boiling hydrocarbons.

It is obvious, of course, that in the practice of this invention some other gas or vapor which is chemically inert under the conditions of the esterification reaction can be used to continuously strip water vapor from the reacting mixture.

The following examples will demonstrate some specific preparations made using the process of this invention.

EXAMPLE 1

Preparation of Oleodisaturated Glycerides of Palmitic and Stearic Acids

A reaction mixture containing carefully dried reactants in the following ratio was prepared:

| | Grams |
|---|---|
| Diglycerides of palmitic and stearic acids | 60 |
| Oleic acid | 36 |
| p-Toluenesulfonic acid | 0.19 |
| Mineral spirits (boiling point 200–210° C.) | 900 |

The mixed diglycerides of palmitic and stearic acid were obtained commercially as molecularly distilled diglycerides and were prepared from completely hydrogenated lard. Before use, the diglyceride product was dissolved in hexane, washed with water to remove free glycerol, and carefully dried. Dry nitrogen was blown through the dissolved product in order to remove the last traces of moisture. The reaction mixture prepared as above was introduced drop-wise into a reaction flask the temperature of which was maintained at 211 to 233° C. Addition of the reaction mixture required 4½ hours. The reaction was continued for one quarter of an hour after all of the reaction mixture had been added. The reaction product was then stripped of solvent (mineral spirits) using a stream of dry nitrogen gas for a period of about 20 minutes. The stripped reaction product was dissolved in an equal weight of petroleum ether, cooled to 24° C., and filtered to remove a small amount of high melting material that consisted primarily of saturated di- and triglycerides. The fraction removed as the filtrate in the above operation was stripped of petroleum ether using dry nitrogen gas and then dissolved in approximately five times its weight of absolute ethanol and cooled to −16° C. The desired product, a mixture of oleodisaturated glycerides of palmitic and stearic acids, precipitated and was mechanically separated at this point.

Analysis of the product of the reaction is shown in Table I.

TABLE I

[Analysis of product obtained by reaction between oleic acid and diglycerides of palmitic and stearic acids [a]]

| Fraction | Yield, percent | Iodine value | Hydroxyl value | Free fatty acids,[b] percent |
|---|---|---|---|---|
| Unfractionated product | 100 | 32.5 | 14.0 | 10.1 |
| Ppt. from pet. ether at 25° C | 9.1 | 2.9 | 22.6 | 0.6 |
| Ppt. from ethanol at −17° C | 77.7 | 30.4 | 4.6 | 1.2 |
| Filtrate from ethanol ppt | 13.2 | 69.7 | 10.1 | 56.6 |

[a] Reaction catalyzed by p-toluenesulfonic acid and reactants continuously stripped by boiling mineral spirits.
[b] Calculated as oleic acid.

EXAMPLE 2

Preparation of Oleodistearin

A reaction mixture containing carefully dried reactants in the following ratio was prepared:

| | |
|---|---|
| 1,3-Distearin | 16.48 g. |
| Oleic acid | 9.00 g. (20% excess). |
| p-Toluenesulfonic acid | 0.075 g. |
| Mineral spirits (boiling point, 200–210° C.) | 75 ml. |

The solution was run dropwise into the reaction flask over a period of 3 hours while the temperature was maintained at 210–220° C. Then mineral spirits alone was added at the same rate over a period of 1 hour. The reaction product was stripped to remove the residual mineral spirits, dissolved in diethyl ether, and washed with a dilute solution of potassium hydroxide. The free fatty acids, which were removed as soaps, were found on analysis to consist of 9.2% stearic and 90.8% oleic and associated fatty acids. After removal of the diethyl ether from the acid-free glycerides, 21.72 g. of the glycerides was dissolved in an equal weight of petroleum ether, cooled to 25° C., and 2.14 g. of precipitate consisting mostly of distearin was removed. The purified oleodistearin had an iodine value of 29.8. Nearly all melted slightly below 40° C., and the last traces of solids disappeared at 43° C.

Lipase hydrolysis of the purified oleodistearin product to remove a portion of the fatty acid groups in the 1- and 3-positions yielded a mixture of 37.4% stearic acid and 62.6% oleic acid and the other acids associated with it. These data indicate that the purified oleodistearin product did not consist solely of 2-oleodistearin.

Cooling curves were obtained for the purified oleodistearin product and for pure 2-oleodistearin and 1-oleodistearin. These data established that the oleodistearin product consisted of a mixture containing a large proportion of 1-oleodistearin.

X-ray diffraction patterns of the purified oleodistearin product were obtained. When these were compared with patterns of known mixtures of 2-oleodistearin and 1-oleodistearin subjected to the same thermal treatment, it appeared that the oleodistearin product prepared by the improved esterification process consisted of about 75% 1-oleodistearin and 25% 2-oleodistearin.

EXAMPLE 3

Esterification of Saturated Diglycerides With Dibasic Acid

The diglycerides of palmitic and stearic acid were esterified with sebacic acid by the general procedure used in Example 1. A reaction mixture of the following composition was employed.

Diglycerides of palmitic and
  stearic acids_____ 60.70 g. (0.1 mole).
Sebacic acid_____ 10.11 g. (0.05 mole).
p-Toluenesulfonic acid_____ 0.17 g. (0.001 mole).
Mineral spirits (boiling point,
  200–210° C.)_____ 1000 ml.

The solution was run into the reaction flask over a period of 4.5 hours, and the reaction temperature was about 220° C. The reaction product was purified by dissolving it in 5 times its weight of petroleum ether, cooling the solution to 25° C., removing about 1 g. of precipitate (M.P., 72.5° C.), and then crystallizing the bulk of the reaction product from the solution by cooling to −18° C. and filtering. The crystallization at −18° C. was repeated twice. The purified reaction product, 57.8 g., analyzed as follows:

Melting point_____ 44.3° C.
Hydroxyl value_____ 14.7.
Free acids, as sebacic_____ 3.9.
Number average molecular
  weight_____ 1128 (theoretical, 1380).

Another diglyceride diester product was made by esterifying the diglycerides of palmitic and stearic acids with a slight excess of sebacic acid according to the process of Example 1. When the free acids in the reaction product were removed by alkali washing and analyzed, only sebacic acid was found. Thus, any side reactions that would result in interesterification were absent.

Although the present invention has been described with reference to particular embodiments and examples, it will be apparent to those skilled in the art that variations and modifications can be substituted therefor without departing from the principles and true spirit of the invention.

We claim:
1. A process of esterifying directly fatty acid diglycerides with at least one additional acid selected from the group consisting of fatty acids and $C_6$ to $C_{10}$ aliphatic dicarboxylic acids which is different from the fatty acid moieties within the said diglycerides and avoiding intermolecular esterification relative to the individual glyceride product molecules which process comprises mixing equivalent weight quantities of said moisture-free fatty acid diglycerides, said moisture-free additional acid, a moisture-free and inert solvent and about from 0.1 to 0.4 weight percent based on the total weight of reactants of p-tolenesulfonic acid; adding the mixed reactants and inert solvent at a controlled rate to a heated reaction vessel adapted to remove water by azeotropic distillation, the temperature of the reaction vessel being at least as high as the boiling point of the said inert solvent and the controlled rate of addition of reactants and inert solvent to the reaction vessel being such that water produced by the esterification reaction is removed as fast as it is formed.

2. The process of claim 1 wherein oleic acid is reacted with distearin to produce oleodistearin.

3. The process of claim 1 wherein oleic acid is reacted with the mixed diglycerides of palmitic and stearic acid to produce monounsaturated disaturated triglycerides.

4. The process of claim 1 wherein the dibasic acid is reacted with diglycerides of fat forming acids to produce a product consisting of molecules that contain two diglyceride groups linked to the dibasic acid through ester linkages.

5. The process of claim 1 wherein sebacic acid is reacted with distearin to produce bis[1-(stearoyloxymethyl)2-(stearoyloxy)ethyl] sebacate.

6. The process of claim 1 wherein adipic acid is reacted with distearin to produce bis[1-(stearoyloxymethyl)2-(stearoyloxy)ethyl] adipate.

References Cited in the file of this patent
UNITED STATES PATENTS
| | | |
|---|---|---|
| 2,575,196 | Smith | Nov. 13, 1951 |
| 2,759,967 | Cash et al. | Aug. 21, 1956 |
| 2,874,175 | Feuge et al. | Feb. 17, 1959 |

OTHER REFERENCES
Landmann et al.: "J. Am. Oil Chem. Soc." vol. XXXVII, pages 638 to 643, December 1960.